United States Patent [19]
Zottl

[11] 4,110,755
[45] Aug. 29, 1978

[54] PULSE RADAR DEVICE WITH PHASE- OR FREQUENCY-MODULATION

[75] Inventor: Anton Zottl, Munich, Fed. Rep. of Germany

[73] Assignee: Siemens Aktiengesellschaft, Berlin & Munich, Fed. Rep. of Germany

[21] Appl. No.: 74,893

[22] Filed: Sep. 22, 1970

[30] Foreign Application Priority Data

Sep. 26, 1969 [DE] Fed. Rep. of Germany ....... 1948758

[51] Int. Cl.² ............................................. G01S 9/233
[52] U.S. Cl. ............................................. 343/17.2 PC
[58] Field of Search ..................... 343/17.2 R, 17.2 PC

[56] References Cited
U.S. PATENT DOCUMENTS

| | | | |
|---|---|---|---|
| 3,366,955 | 1/1968 | Mattern | 343/17.2 R |
| 3,413,635 | 11/1968 | Moore | 343/17.2 R |
| 3,487,409 | 12/1969 | Thiele et al. | 343/17.2 R |
| 3,526,894 | 9/1970 | Guilhem et al. | 343/17.2 R X |
| 3,701,154 | 10/1972 | McKinney | 343/17.2 PC X |

Primary Examiner—T.H. Tubbesing
Attorney, Agent, or Firm—Hill, Gross, Simpson, Van Santen, Steadman, Chiara & Simpson

[57] ABSTRACT

A pulse radar device employs binary coding of the transmitted signal, hard limiting of the received signals and compression of the received signals. During compression the signals which exceed a predetermined threshold value are summed for evaluation. A tapped delay line and selectively located phase reversers at the taps read the received code against the transmitted code. The code may also be synchronously changed at the transmitter and receiver as an additional security measure.

1 Claim, 5 Drawing Figures

PULSE RADAR DEVICE WITH PHASE- OR FREQUENCY-MODULATION

BACKGROUND OF THE INVENTION

1. Field of the Invention

This invention relates to pulse radar devices and more particularly to pulse radar devices which employ apparatus for preventing the evaluation of interference signals after a summation of the compressed received frequency or phase modulated signals.

2. Description of the Prior Art

It is known with radar devices to provide the pulses transmitted with a modulation, which makes it possible upon occurrence of a reflected pulse, to compress the same again timewise in a predetermined manner, dependent on the modulation. In this manner, relatively long pulses of smaller amplitude may be transmitted, and by means of the pulse compression effected at the receiving side, the small resolution occurring with long pulses is again removed. In this manner, above all, frequency- or phase-modulated pulses are transmitted, whereby the impressed modulation is the criterion for the compression to be effected at the receiving side.

SUMMARY OF THE INVENTION

The problem serving as basis for the invention and the objective of the invention, starting with pulse radar devices with phase- or frequency-modulation of the transmitting pulses and pulse compression on the receiving side, is to find a way in which to make it possible that interference pulses are not employed for evaluation. In accordance with the invention, this is attained thereby, that for the suppression of interference pulses prior to the compression, means are provided for effecting a hard limitation of the received signals and that only such received signals are released for the evaluation, which summed up by summing means after the compression, exceed a predetermined threshold value.

BRIEF DESCRIPTION OF THE DRAWINGS

The invention, its organization, operation and construction, will be explained in greater detail below with reference to the accompanying drawings, in which:

FIG. 1b shows a transmitting signal modulated with the phase code according to FIG. 1a;

DESCRIPTION OF THE PREFERRED EMBODIMENTS

Figure 1A:
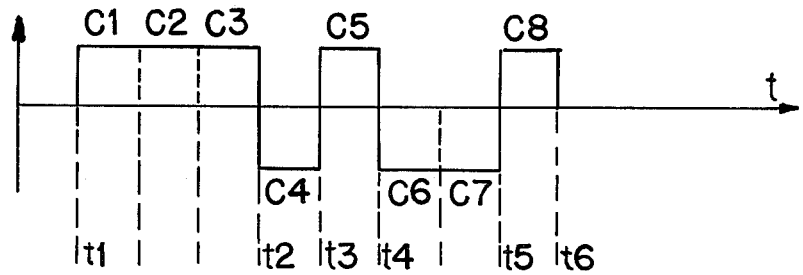
FIG. 1a shows an example of a phase code for a transmitting signal.

In FIG. 1a is shown in relation to the time $t$ an eight-point (or eight-digit) phase code for a transmitting signal of a radar device to be modulated in its phase. This phase code is put together from the individual phases.

| C1 | C2 | C3 | C4 | C5 | C6 | C7 | C8 |
|----|----|----|----|----|----|----|----|
| 0° | 0° | 0° | 180° | 0° | 180° | 180° | 0° |

The number of the individual code elements is dependent on how high are the requirements for the interference suppression and what technical expenditure may be made for the radar device.

Figure 1B:
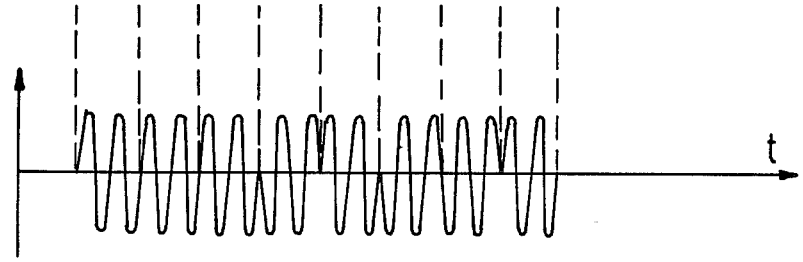

In FIG. 1b are shown the oscillations of a transmitting signal modulated according to the code of FIG. 1a. Each of the code elements is thereby provided with two entire oscillations, so that for the first three code elements C1, C2, C3, according to FIG. 1a, a continuous cycle of oscillation commencing at $t1$ occurs, of six oscillations in all. At the time $t2$, that is, at the commencement of the code element C4, there takes place a phase-shift or -jump of 180° in the modulated oscillation; this oscillation lasts then up to $t3$, when renewed at the commencement of the code element C5, a phase-shift or -jump of 180° takes place. At the time $t4$ (commencement of the code element C6) there takes place anew a 180° phase-shift or phase-jump; the oscillation then setting in remains for four entire oscillations in all (C5 and C6) up to $t5$ in phase, where then anew a phase-shift of 180° takes place on account of the code element C8.

After the reflection of a transmitting signal modulated according to FIG. 1b, the reflected pulse has again the same composition according according to phase as the transmitting signal. If now the arriving reflected pulse is conducted over a retarding conduit V, then, as the coding of the transmitting signal is known, the arriving reflected pulses may be made coherent or the pulses may be produced with the same sign-digit, respectively, that with the code elements C4, C6 and C7 in each case phase shiftings of 180° are effected. This evaluation takes place in the ZF-position (intermediate frequency) or in the video-position with positive or negative pulses. In place of a delay line, in the latter case, suitably a shift register is employed.

Figure 2:
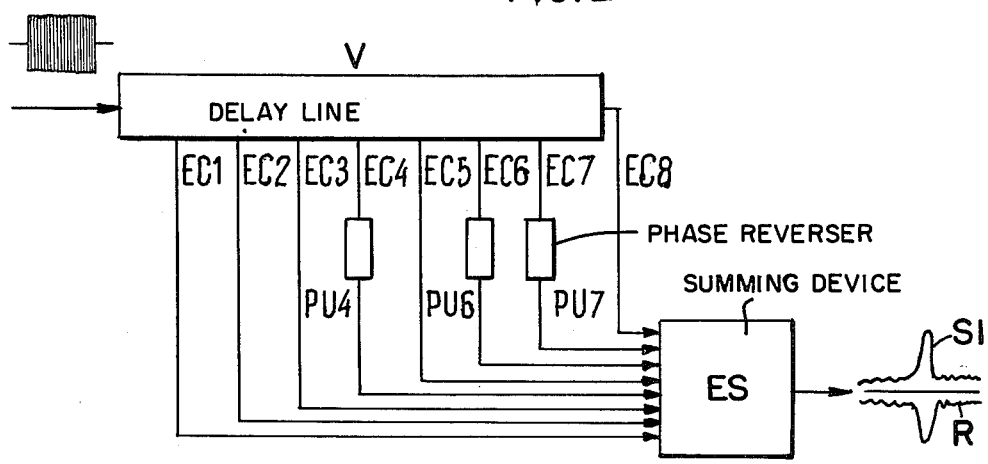
FIG. 2 shows a retarding-and summation-device for a binary phase-coded signal according to FIGS. 1a and 1b.

In the arrangement according to FIG. 2, a delay line V is provided for each code element C1 to C8 with a tap which in each case are timewise about the duration of the width of a code element are staggered with respect to each other, that is, by way of example for the period of time between $t5$ and $t6$. The individual outputs on the delay means V are designated with EC1 to EC8, whereby at the output EC1 the part corresponding to the code element C1 of a reflected echo pulse, and at the output EC2 the part corresponding to the code element C2 is branched off, etc. With the outputs EC4, EC6 and EC7 corresponding to the code elements C4, C6 and C7 there are in each case provided phase-reversal steps PU, so that on the output side, that is in front of or before the summation step at apparatus ES, the entire reflecting pulse emanating from a coded transmitting signal is present in the same phase and coherent in itself. Besides, the parts of the reflecting pulse corresponding to the individual code elements C1 and C8 are at the same time present in the summation states ES, so that they may be added up to the somewhat eightfold value of an individual code element and result in an output signal, at which an individual summing pulse SI distinguishes clearly from the noise R.

Figure 3:
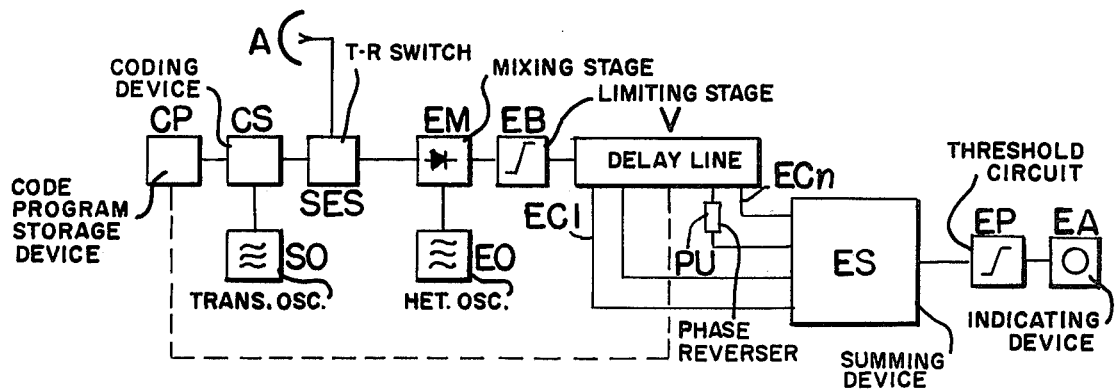
FIG. 3 shows the block circuit diagram of a pulse radar device with phase coding according to the invention.

In the block circuit diagram according to FIG. 3, the antenna of the radar-device is indicated by A. It is connected over a transmitting-receiving-switch SES selectively with the receiving part shown to the right and the transmitting part shown to the left. The high frequency pulses are produced in a transmitting oscillator SO and are coded in a coding device CS phase-wise or frequency-wise according to a code, which is contained in a code program storage device CP. The signals received are conveyed to a receiving mixing stage EM; the associated heterodyning oscillator is indicated by EO. In a limiting stage EB a hard limitation of the receiving signal takes place in such manner, that as much as possible any amplitude deviation is removed. For this it is particularly advantageous if the limitation begins at the level of the receiving noise present at this point, that is, received signals are no greater than the level of the receiving noise. The delay means V has outputs EC1 to EC$n$, whereby $n$ corresponds to the number of the code element, out of which the transmitting pulse is composed. Upon occurrence of a reflecting pulse arising from a coded transmitting signal there appear in the summation device ES all the signal parts corresponding to the individual code elements simultaneously and in the same phase. There takes place a superimposition (compression), so that a short pulse considerably above the noise is produced. A threshold circuit EP connected in series permits solely the passage of signals which exceed the noise level by a predetermined, preferably adjustable value. These signals are then transmitted to an indicating device EA or an evaluation device, for example, a computer.

If now an interference signal occurs, which has a great amplitude indeed compared with customary reflecting pulses, but does not contain the coding shown in FIGS. 1a, 1b, then it will be diminished in the limiter EB in its level to the noise level and reaches the delay device V. Also when this interference signal is coherent in itself, the summing up in the integration-or summation-device ES cannot lead to the same level as with a genuine reflecting pulse of the radar device, because at one part of the outputs EC1 to EC$n$ of the delay line V are provided phase-reversal stages PU, so that upon the summation there occur oscillations with opposite phase, which lead to a level decrease. If for, example, use were to be made of the code shown in FIG. 1a, then a genuine target reflected pulse which would be approximately eightfold that of a basic level $P_o$ indicated by the limitation, would occur, while at an interference pulse, on account of the three opposite-phase portions due to the phase reversal stages PU4, PU6 and PU7, only about two times that of the basic level $P_o$ would be produced as starting level of the summation stages ES. If accordingly the level threshold EP is for example set at 5 $P_o$, no indication of the interference signal takes place.

An interference suppression is also then possible, when the interference signal and a somewhat genuine reflecting pulse coincide, as long only as the interference signal is not so long, that it completely covers the genuine reflecting pulse over its entire duration of time. This arises therefrom that, if for example, only one part, for example, the code elements C1 to C5 of the reflecting pulses are still decoded correctly, already a starting signal is produced after the summation stage ES of about 5 $P_0$, and if one assumes that the three last code elements C6 to C8 on account of the interference pulses contribute nothing more to the indication. If now the threshold EP is adjusted to 4 $P_o$, then also in this case still appears an indication of the genuine reflecting pulse; interference signals, which may reach a maximum level of 2 $P_o$, are, to the contrary, not indicated.

It is advisable to effect the pulse compression in the Videoposition, because this would result in a simple construction of the apparatus.

It is possible, in order to prevent enemy jammers to produce an initiation of the code or to make such imitation difficult, to make available in the code-program-storage device CP consecutively different codes for the coding of the transmitting signal and correspondingly to change over on the receiving side synchronously herewith the decoding devices, that is, in the present example, the delay device V or its taps EC1 EC$n$ and the phase reversal stages PU. This is indicated by the dash line between the code program storage device CP and the delay means V.

Figure 4:
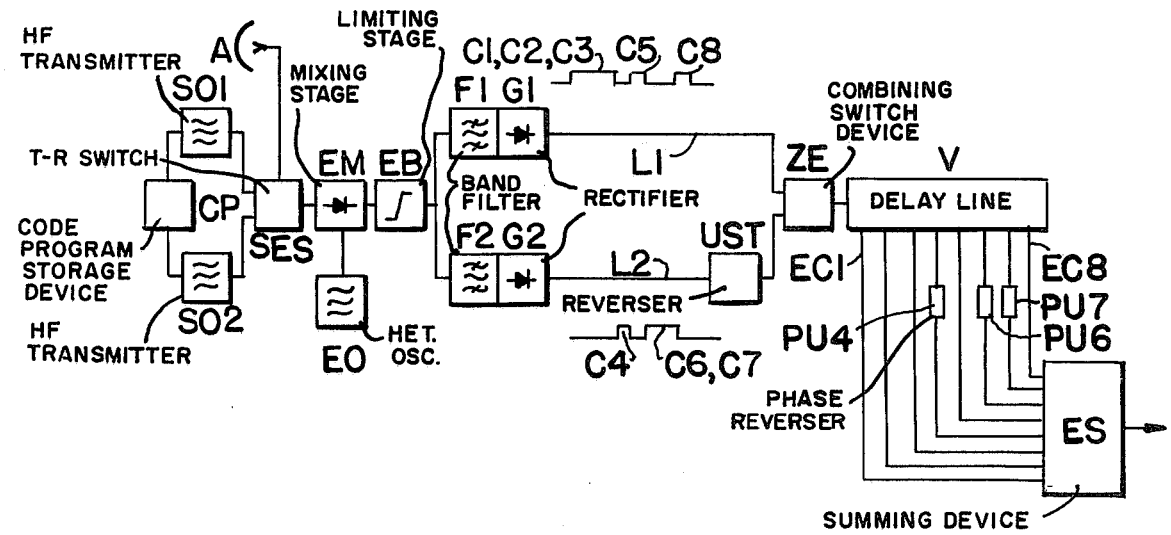
FIG. 4 shows the block circuit diagram of a pulse radar device with frequency coding according to the invention.

When employing a frequency coding, one may for example, transmit signals consisting of a combination of two frequencies. The block circuit diagram of such a radar device is shown in FIG. 4. From the code program storage member CP alternatingly two HF-transmitters SO1 and SO2 are scanned. The elements in each case indicated by the same letters have the same functions as in FIG. 3. The reflecting pulses reach the ZF-position to the two band filters F1 (for frequency $f1$) and F2 (for frequency $f2$). At the output, rectifiers G1, G2 connected in series produces signals in the lines L1 and L2, which have the distribution shown for a code in the form indicated in FIG. 1a. Thereby it is assumed that the code elements C1, C2, C3, C5 and C8, are associated with the frequency $f1$ and that the code elements C4, C6 and C7 are associated with the frequency $f2$. In the line L2 is provided a reversal stage UST which reverses the signals in the phase or in the sign-digit, respectively. The signals arriving at the combining switch device ZE have at a correct coding the form shown in FIGS. 1a, 1b. From the delay device V, they may be taken in the same manner and given to the summation device ES as is explained for phase-coded signals in connection with FIGS. 2 and 3. Signals with the correct frequency code produce a large starting voltage at the summation device ES, signals with an incorrect coding to the contrary produce small starting voltages, which lie below the threshold value and are no longer evaluated.

it is advisable to provide doppler filters in the receiving branch and thereby permit solely moved target reflected pulses for the indication. Furthermore, it may be of advantage to provide receiving channels.

Many others changes and modifications may be made by one skilled in the art without departing from the spirit and scope of this invention and it is to be understood that I intend to include within the patent warranted hereon all such changes and modifications as may reasonably and properly be included within the scope of my contribution to the art.

I claim as my invention:

1. A pulse-radar device with phase-or frequency-modulation of the transmitting pulses and pulse compression at the receiver, comprising means for the suppression of interference pulses prior to the compression including means providing a hard limitation of the received pulses, means for summing the limited signals and means providing a predetermined threshold level so that only such received signals are released for evaluation which when summed up after compression exceed said predetermined threshold level, said pulses being binary frequency-coded, means for separating the received signals interposed between said means providing a hard limitation and said means for summing the limited signals including two band filters, means interposed at the output of one of said band filters for additionally pole-or phase-reversing the corresponding signals, and a delay device, connected to receive signals from said band filters, said delay device having a plurality of distributed taps and operable to provide said binary pulses individually at said taps, and a plurality of 180° phase advancers connected between those taps for one of the two types of binary pulses and said means for summing the limited signals so that those pulses belonging to a reflecting pulse of a modulated transmitting pulse are added at the same time.

* * * * *